United States Patent [19]

Rabiner

[11] Patent Number: 4,860,358

[45] Date of Patent: Aug. 22, 1989

[54] SPEECH RECOGNITION ARRANGEMENT WITH PRESELECTION

[75] Inventor: Lawrence R. Rabiner, Berkeley Heights, N.J.

[73] Assignee: American Telephone and Telegraph Company, AT&T Bell Laboratories, Murray Hill, N.J.

[21] Appl. No.: 134,491

[22] Filed: Dec. 18, 1987

Related U.S. Application Data

[63] Continuation of Ser. No. 531,354, Sep. 12, 1983, abandoned.

[51] Int. Cl.$^4$ ............................................. G10L 5/00
[52] U.S. Cl. ...................................................... 381/43
[58] Field of Search ..................................... 381/41–43

[56] References Cited

U.S. PATENT DOCUMENTS

| | | | |
|---|---|---|---|
| 3,812,291 | 5/1974 | Brodes et al. | 381/43 |
| 3,816,722 | 6/1974 | Sakoe | 235/152 |
| 4,181,821 | 1/1980 | Pirz et al. | 179/1 |
| 4,256,924 | 3/1981 | Sakoe | 179/1 |
| 4,435,617 | 3/1984 | Griggs | 381/43 |
| 4,559,604 | 12/1985 | Ichikawa et al. | 381/43 |
| 4,573,187 | 2/1986 | Bui et al. | 381/43 |
| 4,736,429 | 4/1988 | Niyoda et al. | 381/43 |
| 4,741,036 | 4/1988 | Bahl | 381/43 |
| 4,759,068 | 7/1988 | Bahl | 381/43 |

OTHER PUBLICATIONS

"Discrete Utterance Speech Recognition Without Time Normalization", *ICASSP Proceedings*, J. E. Shore et al., pp. 907–910.

Primary Examiner—Emanuel S. Kemeny
Attorney, Agent, or Firm—Wilford L. Wisner

[57] ABSTRACT

An arrangement and a method for recognizing a speech pattern employs a quick initial processing based upon subpatterns of speech features from which time-sequence information has been removed is followed by more conventional processing of a plurality of the best candidates. The initial processing, or pre-selection, eliminates large numbers of unlikely candidates, the best candidates being retained by setting an empirically determined threshold for similarity, as measured by a suitable distance measurement. To facilitate retrieving the complete speech feature patterns including time-sequence information for the subsequent processing, the code books of the subpatterns also contain associated indices pointing to the corresponding complete patterns.

3 Claims, 7 Drawing Sheets

SPEECH RECOGNITION ARRANGEMENT WITH PRESELECTION

This is a continuation of application Ser. No. 531,354 filed Sept. 12, 1983.

TECHNICAL FIELD

This invention relates to speech analysis and, more particularly, to arrangements for recognizing speech patterns.

BACKGROUND OF THE INVENTION

In communication, data processing and similar systems, it is often advantageous to simplify interfacing between system users and processing equipment by means of audio facilities. Speech input and synthesized voice response may then be used for inquiries, commands and for exchange of data and other information. Speech based interface apparatus also permits communication with processing apparatus from remote locations without hand-operated terminals and allows a user to perform other functions at the same time.

Speech patterns, as is well known in the art, are relatively complex and exhibit a high degree of variability among speakers. These factors have made it difficult to devise accurate automatic speech recognition equipment. Acceptable results have been achieved in special situations restricted to constrained vocabularies and to particular individuals. Expanding the number of speakers or the vocabular to be recognized, however, causes an unacceptable decrease in accuracy for practical utilization.

Speech recognition arrangements are generally adapted to transform an unknown input speech pattern into a sequence of acoustic features. Such features may be based on a spectral or a linear predictive analysis of the pattern. The feature sequence generated for the pattern is then compared to a set of previously stored acoustic feature patterns representative of reference utterances for a selected vocabulary. As a result of the comparison, the input speech pattern is identified as the closest corresponding reference pattern. The accuracy of the recognition process is therefore highly dependent on the selected features and the predetermined criteria controlling the comparison.

While many comparison techniques have been suggested for recognition, the most successful ones take into account variations in speech rate and articulation. One such technique, dynamic programming, has been employed to determine an optimum alignment between acoustic feature patterns in the speech recognition process. Advantageously, dynamic time warping of patterns in accordance with dynamic programming principles mitigates the effects of differences in speech rate and articulation. Signal processing systems for dynamic time warping based recognition such as disclosed in U.S. Pat. No. 3,816,722 are relatively complex, must operate at high speeds to provide results in real time and require very large digital storage facilities. Further, the recognition processing time is a function of the size of the reference vocabulary and the number of reference feature patterns needed for each vocabulary item. Consequently, speaker-dependent recognition for vocabularies of the order of 50 words is difficult to achieve in real time.

Several techniques have been suggested to improve speech recognition processing time. One arrangement disclosed in U.S. Pat. No. 4,256,924 issued to H. Sakoe on Mar. 17, 1981 utilizes a set of standard vectors to represent the reference speech pattern acoustic features so that the complexity of the dynamic time warping as well as the time delay required are reduced. It is necessary, however, to perform a dynamic time warping operation for each reference pattern in the vocabulary set. An alternative scheme described in the article, "Discrete Utterance Speech Recognition Without Time Normalization" by John E. Shore and David Burton, *ICASSP Proceedings*, May 1, 1982, pp. 907–910, performs a vector quantization to produce a code book for each reference word in a vocabulary set. A signal representative of the similarity between the sequence of input speech pattern features and the sequence of code book features for each word in the reference vocabulary is then generated and the best matching reference is selected. While the vector quantized code book recognition eliminates the delays in dynamic time warp processing, the accuracy obtained is subject to errors due to variations in speech rate and articulation. It is an object of the invention to provide improved speech recognition having high accuracy and reduced processing time requirements.

BRIEF SUMMARY OF THE INVENTION

According to my invention, the speech features extracted from an input utterance are first compared against reference speech features from which time and sequence information has been removed. In order to do this, time and sequence information is also removed from the input utterance speech features before the comparison. As a result, no dynamic time warping or other dynamic programming is needed for this comparison. Then, except the case in which an unequivocal best match is found in this first comparison, the poorer candidates from the reference speech features are eliminated; and the best candidates are used in more complete form including time and sequence information for a subsequent more precise comparison procedure of the dynamic programming type, involving comparison with the input utterance speech features in their original more complete form. Specifically, this subsequent comparison may use dynamic time-warping, but can be done rapidly and effectively because of the relatively small number of different reference speech features employed in this second comparison procedure.

Since the input utterance speech features and the reference speech features are each to be used in two different forms for the two comparisons, an associaltion is retained between each complete set of speech features and the corresponding set from which time and sequence information is removed in each case. Hereinafter, the set from which time and sequence information is removed will be referred to as a "subpattern" and the more complete set as a pattern.

Further, according to my invention, a threshold level is set for the degree of similarity between a reference subpattern and an input subpattern so that, in the general case, a number of reference patterns corresponding to the similar reference subpatterns are employed in the subsequent more precise comparison procedure. In that subsequent comparison procedure, each input utterance speech pattern (having time-sequence information) is compared to each of the reference speech patterns (having time-sequence information) which satisfied the threshold degree of similarity. Since large numbers of poor matches have already been eliminated by the first comparison procedure, the combination of the two comparison procedures yields a combination of speed and accuracy.

Specifically, errors caused by variations in speaking rate and articulation are eliminated whithout consuming as much time and computing power as heretofore required.

DETAILED DESCRIPTION

Figure 1:
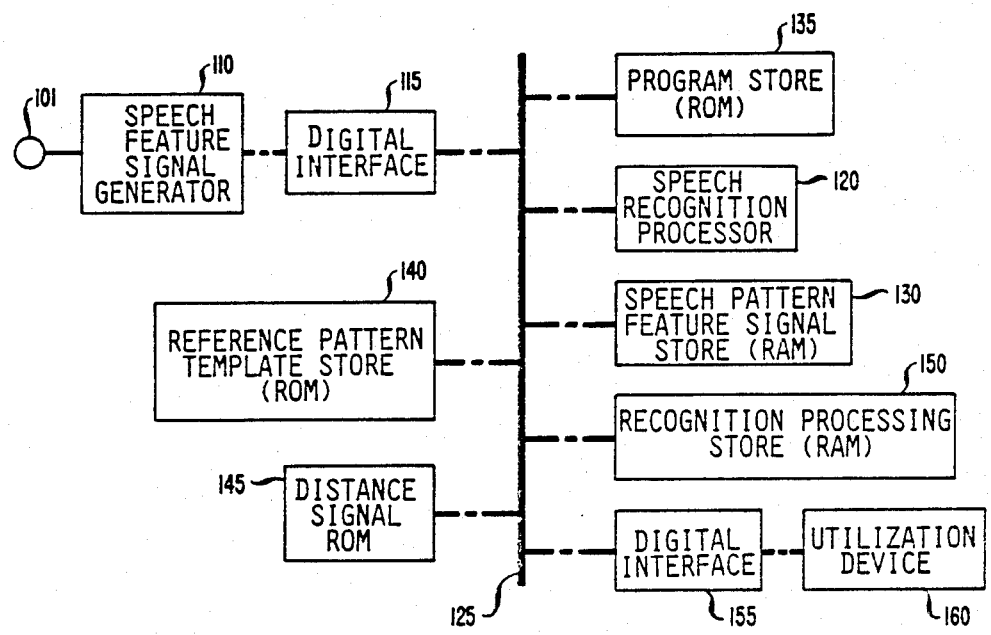
FIG. 1 depicts a block diagramm of a speech recognition arrangement illustrative of the invention.

FIG. 1 is a general block diagram of a speech processor adapted to recognize speech patterns that is illustrative of the invention. An unknown speech pattern is applied to electroacoustic transducer 101, and the electrical signal therefrom is analyzed in speech feature generator 110. Transducer 101 may be a microphone or a remotely connected telecommunication device over which voice signals may be transferred. Feature signal generator 110 is operative to band limit the speech signal from transducer 101 and to digitize the band limited signal. The digitized speech signal is analyzed to form a frame sequence of speech feature signals $$T = T(1), T(2), \ldots, T(i), \ldots, T(L) \quad (1)$$

representative thereof. The feature signals produced by generator 110 may be linear prediction coefficient vectors well known in the art. The generator may utilize the acoustic feature and endpoint detection arrangements disclosed in U.S. Pat. No. 4,181,821 issued to F. C. Pirz et al Jan. 1, 1980 and assigned to the same assignee, or may comprise a microprocessor arrangement including a type MC68000 microprocessor and well known associated memory and peripheral circuits functioning in accordance with permanently stored programmed instructions. Appendix A hereto lists such a set of instructions in FORTRAN language form. The type 68000 microprocessor is described in the publication *MC68000 16 Bit Microprocessor User's Manual*, Second Edition, Motorola, Inc., 1980. It is to be understood, however, that spectral or other speech features may also be used. The feature signal sequence from generator 110 is transferred to speech pattern feature signal store 130 via digital interface 115 and bus 125 under control of speech recognition processor 120. Store 130 as well as store 150 may comprise the OB68K/DRAM memory circuit board made by OMNIBYTE Corp., West Chicago, Ill. 60185, and digital interfaces 115 and 155 may comprise the OMNIBYTE parallel I/O Timer circuit board.

Reference pattern template store 140 is adapted to permanently store two sets of signals for each reference pattern. The first set comprises a the above-described selected set ("code book") of feature signals occurring in the speech pattern from which the time-sequence information has been removed. The second set comprises a sequence of feature signal index codes identifying the speech feature signal sequences including time-sequence information representative of utterances of the reference pattern. In the circuit of FIG. 1, each combination of two sets of signals comprises a set of LPC vector signals where each vector signal is derived from a vector quantizer analysis of an identified utterance, and a set of one or more signals corresponding to the sequence of indices of LPC vectors forming the reference patterns. The set of LPC vector signals for the jth reference pattern can be represented as the vecotr signals $$R_j(1), R_j(2), \ldots, R_j(k), \ldots, R_j(P_j). \quad (2)$$

If the reference pattern vocabulary, for example, is the alphabet for which there are 26 reference patterns. $R_1$ corresponds to the utterance of letter A. $R_2$ corresponds to the utterance of the letter B and $R_{26}$ corresponds to the letter Z. There may be 4 or 5 vectors, $R_1(1)$, $R_2(2)$, ..., $R_5$, stored for each letter. While there are only a few distinct vectors in the reference pattern template code book, the reference pattern comprises a sequence of one or more sets of 30 to 40 of these vectors, as is well known in the art. Each sequence is some combination of the 4 or 5 distinct vectors $R_j(1)$, $R_j(2)$, ..., $R_j(5)$. In addition to the code book of feature signals, a sequence of identification codes representative of the reference pattern is also stored. The letter B (j=2), for example, may have a code book of 4 vectors $R_2(1)$, $R_2(2)$, $R_2(3)$ and $R_2(4)$. This code book of 4 vectors is the first signal set in store 140 for the reference $R_2$ corresponding to the letter B. A reference pattern can then be represented by a series of M code book vector identification codes $q_j(k)$ where each index q corresponds to the code book vector $R_j(k)$ and M is the number of frames in the reference vector pattern. The letter B is then represented as a prescribed sequence of M=40 code book indices as follows $$q_2(4), q_2(4), q_2(3), \ldots, q_2(1), q_2(1) \quad (3)$$

Thus where $q_2(1)$ is the index for $R_2(1)$, $q_2(2)$ is the index for $R_2(2)$, $q_2(3)$ is the index for $R_2(3)$, and $q_2(4)$ is the index for vector $R_2(4)$, template store 140 includes a first set of signals consisting of a relatively small number of code book vector signals for each reference pattern and a second set of signal set of signals consisting of a sequence of code book indices representative of each entire reference pattern.

Figure 2:
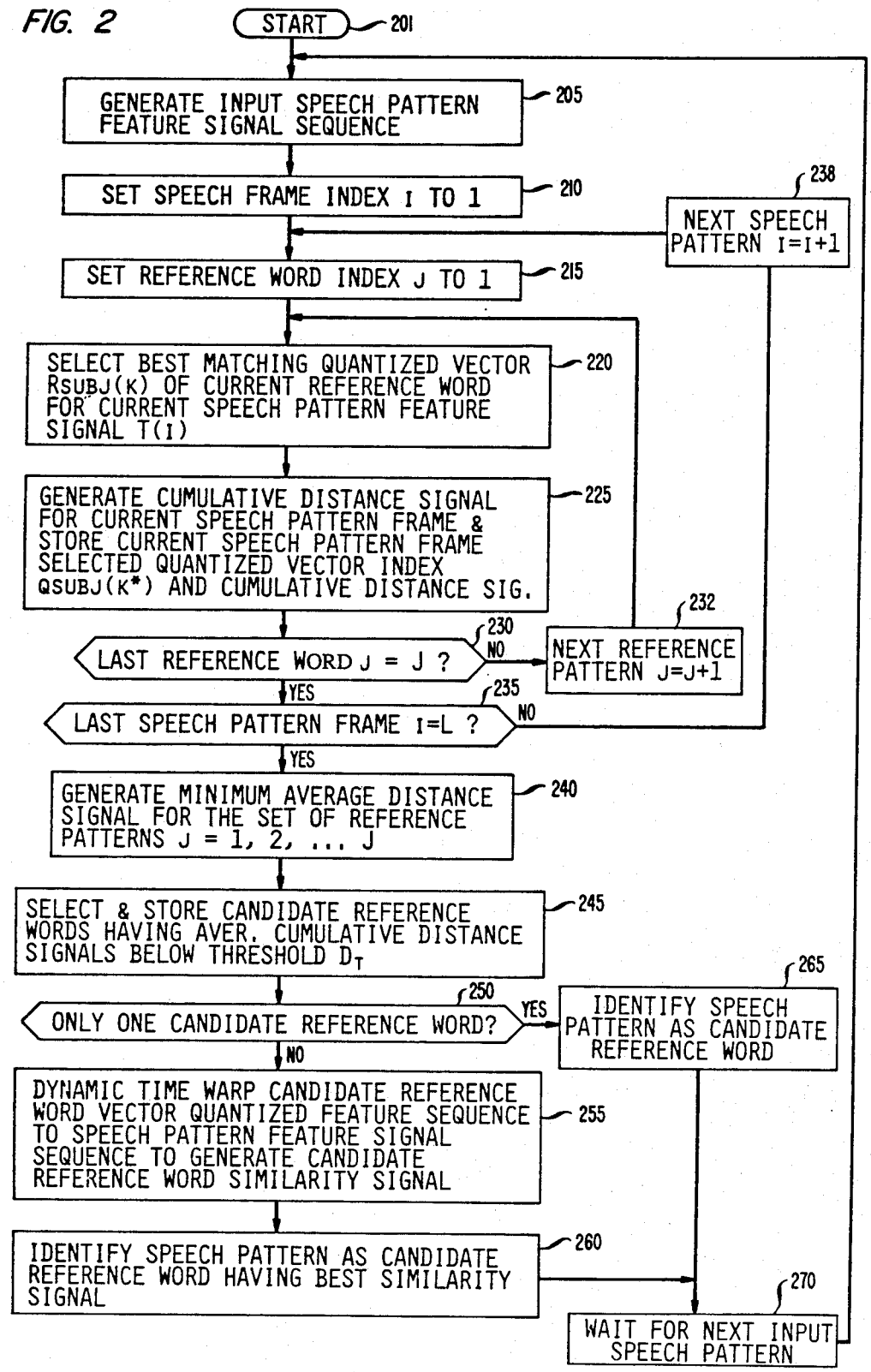
FIG. 2 depicts a general flow chart that is illustrative of the invention.

FIG. 2 shows a flow chart that illustrates the general operation of the recognizer of FIG. 1. Referring to FIG. 2, the recognition operation is initiated by the generation of a feature signal sequence for an input speech pattern and transfer of the sequence to store 130 as per box 205. Input speech pattern frame index i is set to one so that the first speech pattern frame signal T(1) is transferred from store 130 to recognition processor 120 via bus 125 (box 210). Processor 120 and bus 125 may comprise the OMNIBYTE OB68K1 computer board. Reference pattern index j is then set to one (box 215) whereby processor 120 addresses the first reference pattern template in store 140. Operation box 220 is entered and processor 120 is adapted to compare the current input speech pattern frame i feature signal T(i) with the set of code book vector signals $R_j(k)$, $k = 1, 2, \ldots, P_j$, of the current reference template j in store 140 and to select the best matching code book vector $R_j(k)$ for T(i). An index k* identifying the selected quantized vector is stored in recognition processing store 150 as addressed by reference pattern index j and input speech pattern index i.

Subsequent to the selection of the code book vector $R_j(k^*)$, a cumulative distance signal $d(j)$ is generated for reference j in processor 120 as per operation box 225 in accordance with $$d_i(j) = \sum_{m=1}^{p+1} T(i)_m R_j(k^*)_m - 1 + d_{i-1}(j) \qquad (4)$$

where $T(i)_m$ is the mth component of the input speech vector for frame i, $R_j(k^*)_m$ is the mth component of the jth reference pattern code book vector, and p is the number of linear prediction coefficients. The initial value for $d_i(j)$ is zero.

The distance signal is inserted in store 150 as addressed by reference pattern index j. Until the last reference pattern quantized vector set has been accessed and processed, box 210 is reentered via decision box 230 and index incrementing box 243. When the processing indicated in the loop including boxes 210 through 230 has been completed for the current speech pattern frame i, a set of selected quantized vector index signals $$k_{i1}^*, k_{i2}^*, \ldots, k_{ij}^*, \ldots, k_{iJ}^* \qquad (5)$$

one for each reference pattern j and a corresponding set of cumulative distance signals $$d_i(1), d_i(2), \ldots, d_i(j), \ldots, d_i(J) \qquad (6)$$

are stored in store 150. Each vector quantized index signal $k^*$ is representative of the closest matching a reference vector of pattern j for the current speech frame feature signal and the cumulative distance signal is representative of the similarity between the reference pattern j and the input speech pattern up to the current speech pattern frame i.

Upon completion of the reference vector selection and similarity signal generation for the last reference pattern J of the current speech pattern frame i, frame i is compared to the last speech frame L as per decision box 235. The succeeding speech frames are processed in the loop from box 210 to box 235 via index incrementing box 238 until all reference vector selections have been made and all similarity signals have been generated for frame L in processor 120. The selected reference vectors and speech pattern similarity signals are stored in recognition processing store 150 as addressed by reference pattern. Thus, the indices of the reference vector series for reference pattern j are $$k_{1j}^*, k_{2j}^*, \ldots, k_{ij}^*, \ldots, k_{Lj}^* \qquad (7)$$

and the similarity signal for pattern j is $d_L(j)$.

At this point in the operation of the recognizer circuit of FIG. 1, an average cumulative distance signal $$d_L(j)/L \qquad (8)$$

is produced for each reference pattern in processor 120 as per operation box 240. These average cumulative distance signals are compared to a predetermined threshold signal $D_t$ stored in store 150 and those reference patterns whose average cumulative distance signals fall below the threshold $D_t$ are identified as candidates for the unknown speech pattern in processor 120 in accordance with operation box 245. The threshold signal may be adapted to the input speech pattern, as will be described.

In the event only one candidate reference pattern is identified in box 245, box 265 is entered via decision box 250 and the speech pattern is identified as the sole candidate. Otherwise, the feature signal sequence of each candidate reference pattern is dynamically time warped to the input speech pattern feature sequence as per operation box 255 in processor 120 to generate candidate reference pattern similarity signals. These similarity signals may be compared to identify the candidate that best corresponds to the input speech pattern (box 260). After the operations of box 260 are completed, box 265 is entered and the speech pattern is identified. Wait box 270 is then activated so that the recognizer of FIG. 1 is placed in an initial state preparatory for analysis of a subsequent input speech pattern.

Selection of candidate reference patterns in accordance with the invention is a rapid process that does not require complex time alignment and serves to remove reference patterns from consideration that deviate significantly from the input speech pattern. In most cases, only one candidiate reference pattern is detected and complex and time consuming dynamic time warping is totally avoided. There are, however, some input speech patterns which result in two or three candidate reference patterns. In these cases, the dynamic time warping recognition processing is limited to the candidates and may be done so that only the quantized vector sequences selected in the candidate formation need be used. In this way, the dynamic time warping processing time is greatly reduced and the storage requirements for the system are limited.

Figure 3:
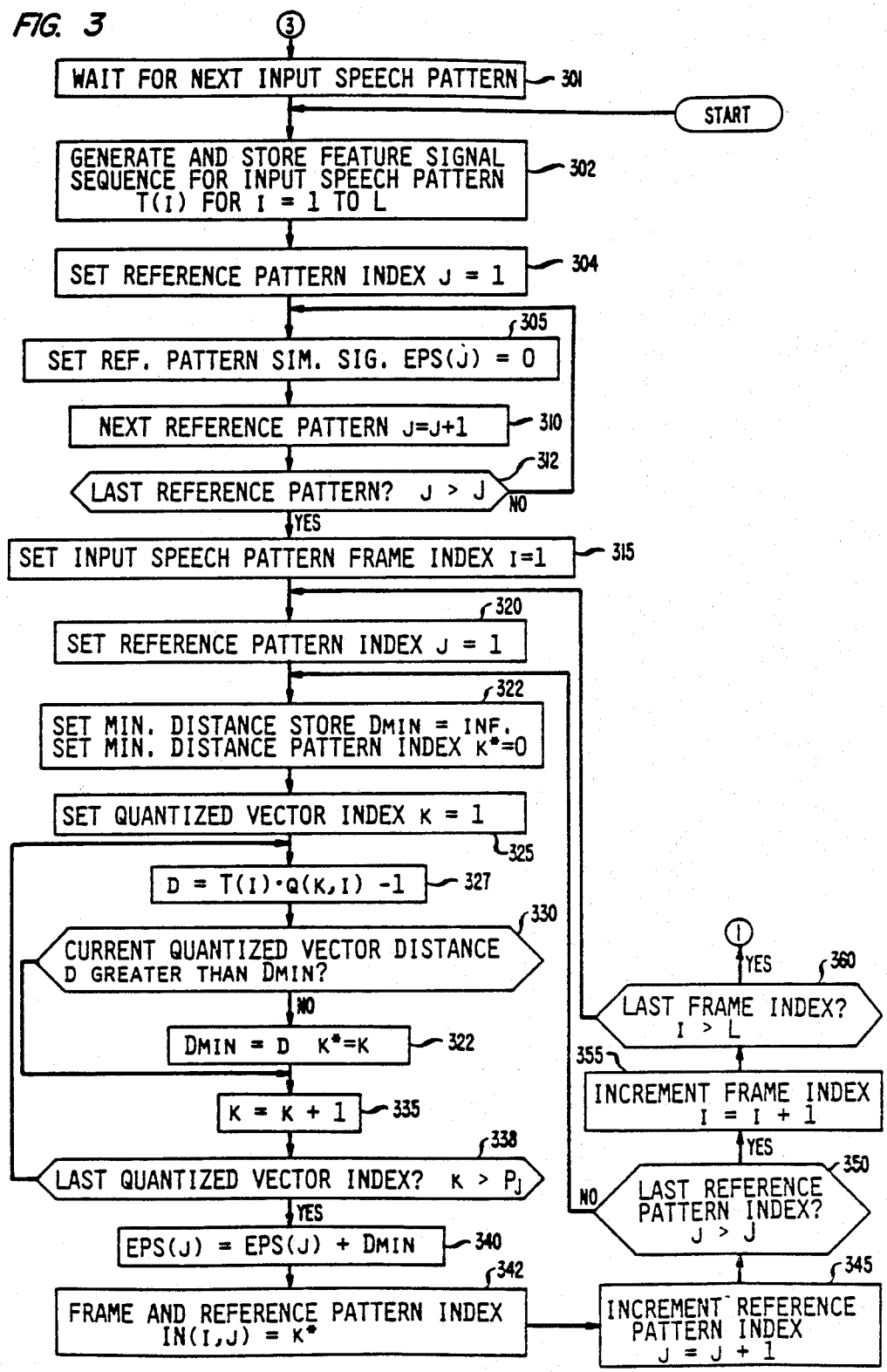
FIGS. 3, 4 and 5 are detailed flowcharts illustrating the operation of the circuit of FIG. 2.
Figure 4:
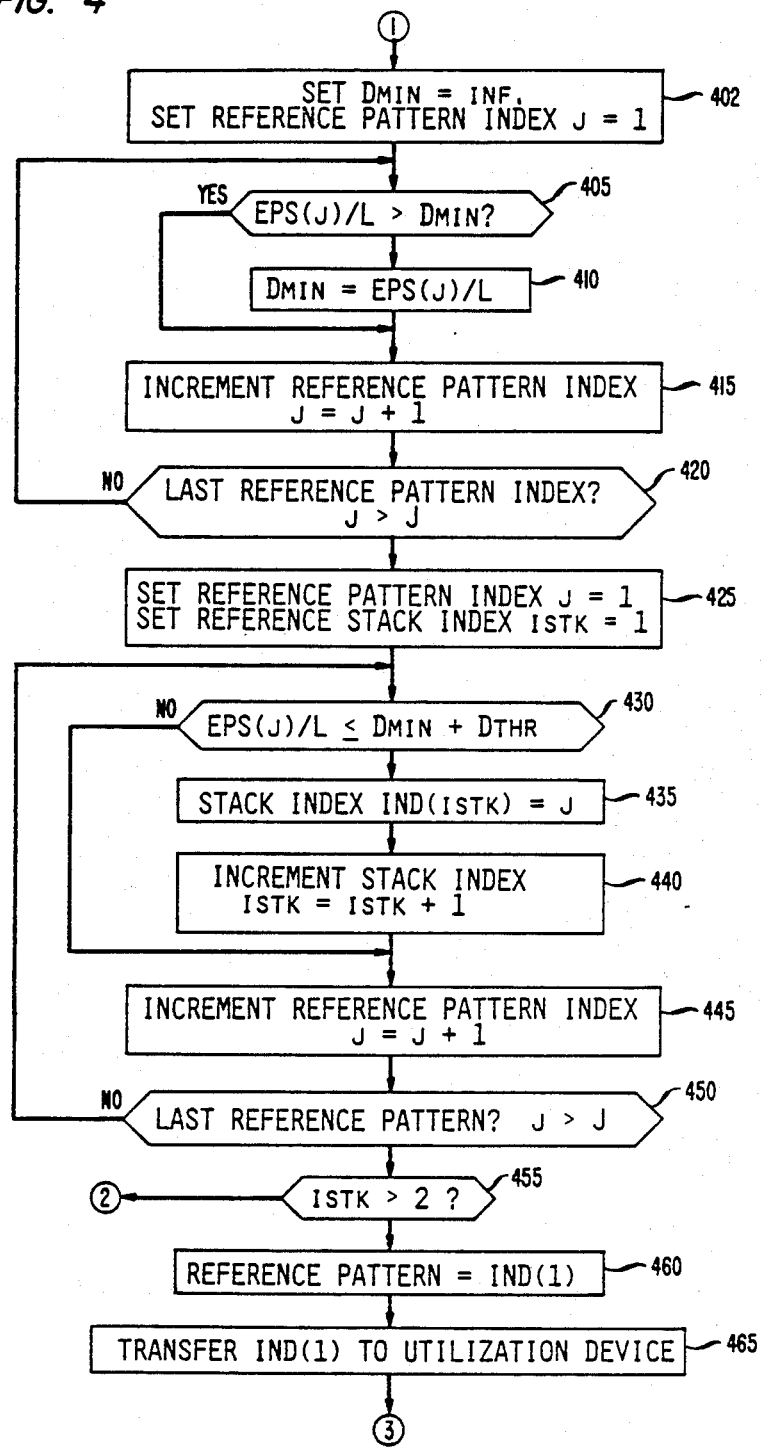
Figure 5:
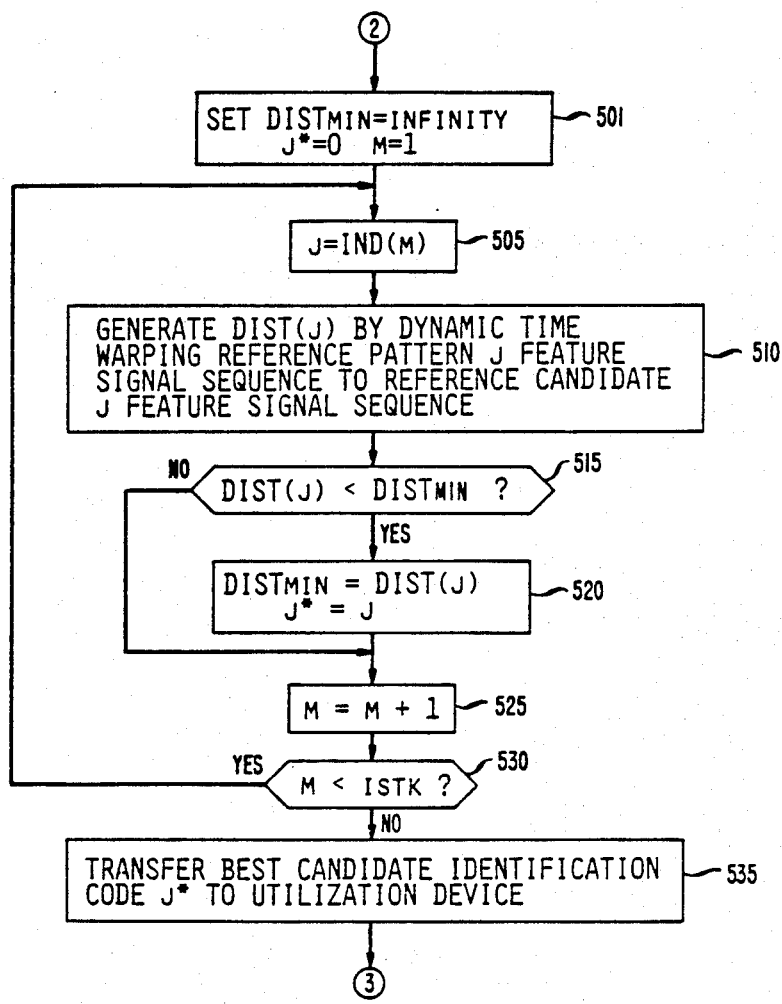

The flow charts of FIGS. 3, 4 and 5 show the detailed operations of the circuit of FIG. 1 where the template subpatterns are identical to the reference patterns. Appendix B hereto is a FORTRAN language listing of the set of permanently stored instructions of program memory 135 adapted to perform the operations shown in FIGS. 3, 4 and 5. In particular, FIG. 3 is a detailed flow chart that illustrates the selection of reference pattern feature signals for the successive frames of the input speech pattern and the generation of reference pattern similarity signals in the circuit of FIG. 2. Referring to FIG. 3, the input speech patern is analyzed in feature signal generator 110 and the resulting sequence of feature signals T(i) are placed in store 130 (box 302). Reference pattern index j is then set to 1 (box 304) in processor 120 and J EPS storage locations in recognition processing store 150 and are reset to zero in the loop including boxes 305, 310 and 312. These locations are used to store the similarity signals for the generated similarity signals. The current signal EPS(j) is set to zero (box 305). Index j is incremented (box 310) and box 305 is reentered via box 312 until the EPS(J) signal is zeroed.

After the EPS signal zeroing operations, input speech pattern index i and reference pattern index j are set to one as per boxes 315 and 320. The minimum distance signal $D_{min}$ is reset to infinity (largest possible signal processor number); the minimum distance quantized vector index $k^*$ is set to zero (box 322); and the quantized vector k corresponding to the reference pattern feature signals in store 150 is reset to one (box 325). Code book feature vector $R_j(k)$ for the jth vocabulary pattern and the current input speech pattern feature signal T(i) are compared to form a distance signal in accordance with equation (4) as per box 327. This distance signal is tested as per decision box 330. If it is less than the stored signal $D_{min}$, it replaces the value in $D_{min}$ and k* is set equal to k (box 332). Otherwise, signals $D_{min}$ and k* remain unaltered. In either case, quantized vector index k is incremented (box 335) and box 327 is reentered via decision box 338 until the last quantized reference feature signal $R_j(M)$ is compared to T(i). As a result of the operatons of boxes 327 through 338, the quantized reference feature vector $R_j(k*)$ that most closely matches the current speech pattern feature signal is selected for reference pattern j. The similarity signal for reference pattern j is then updated for the current input speech pattern frame as per box 340 and the frame end reference pattern index IN(i,j) identifying $R_j(k*)$ is set to k* (box 342).

The quantized vector selection process of boxes 327 through 342 is repeated for the next reference pattern after reference pattern index j is incremented (box 345) via decision box 350. Upon completion of the selection process for the Jth reference pattern, input speech pattern index i is incremented in box 355 and the selection of quantized reference feature signals for the next speech pattern frame is started in box 320 via decision box 360. The selection process is terminated when i is incremented to L+1 in box 355. At this point in the operation of the circuit of FIG. 1, a sequence of quantized reference feature signal indices $$k_{1j}*, k_{2j}*, \ldots, k_{ij}*, \ldots, k_{Lj}* \qquad (9)$$

and a signal, EPS(j), indicative of the similarity between each reference pattern and the input speech pattern, are stored in recognition processing store 150 for each reference pattern j.

FIG. 4 illustrates the operation of the circuit of FIG. 1 in determining reference pattern candidates for the unknown speech pattern from the reference pattern similarity signals obtained in FIG. 3. Upon completion of the acoustic feature selection according to FIG. 3, the signal $D_{min}$ is set to infinity and the reference pattern index j is set to one as per box 402. The loop including boxes 405 through 420 is then entered so that the minimum average distance signal is obtained for the set of reference patterns. The current reference pattern similarity signal is divided by the number of time frames in the input speech pattern and the result is compared to signal $D_{min}$ (box 405). In the event that the current average distance signal is less than signal $D_{min}$, the current average distance signal is stored as signal $D_{min}$ (box 410). Otherwise the previous value of signal $D_{min}$ is retained. In either case, the reference pattern index is incremented (box 415) and the operations of boxes 405 and 410 are repeated until the last reference pattern J has been processed as determined in decision box 420.

The operations of boxed 425 through 450 result in the formation of a stack list of candidate reference patterns. A pattern is selected as a candidate if its average distance signal is within an empirically determined threshold of the previously generated $D_{min}$ signal. As per box 425, the reference pattern index j is reset to one and a candidate stack index istk is set to one. The loop including boxes 430 through 450 is then entered. In box 430, the average minimum distance signal for the current reference pattern is compared to $D_{min}+D_{thr}$. When the average distance signal is less than or equal to the candidate threshold as per box 430, the candidate reference pattern index is stored in the stack so that IND(istk)=j and the stack index is incremented as per boxes 435 and 440. After the test of the current reference pattern is completed, the reference pattern index is incremented (box 445) and box 430 is reentered via last pattern detection box 450. At this point, the stack index istk is tested to determine if the number of candidate reference patterns is one or more than one. In the event that only one candidate reference pattern has been selected, it is identified as the first stack entry IND(1) as per box 460 and its identification code is sent to utilization device 160 via digital interface 155 in FIG. 1 (box 465). Subsequently, the circuit of FIG. 1 is placed in its initial state until a new input speech pattern is received (box 301).

As aforementioned, there are usually a sufficient number of distinctions between most speech patterns so that only one candidate reference pattern is selected. Thus, the preprocessing procedure of FIGS. 3 and 4 is adequate to identify the unknown speech pattern. There are, however, some input speech patterns for which the stack index istk may be greater than one and a plurality of candidate reference patterns must be evaluated more precisely to determine the identity of the unknown speech pattern. In this event, the flow chart of FIG. 5 is entered from decision box 455.

At this time, the circuit of FIG. 1 is conditioned to select the candidate reference pattern that most closely corresponds to the input speech pattern. This may be done by comparing the input speech pattern feature signals in store 130 with the feature signal sequence for each candidate reference pattern identified in the stack using dynamic time warping as described in U.S. Pat. No. 3,816,722 or another arrangement known in the art. It is advantageous, however, to utilize vector quantization techniques to reduce the signal processing delay and storage requirements. The arrangement shown in the flow chart of FIG. 5 uses the feature signal vector index sequence for the candidate reference pattern that was previously placed in recognition processing store 150 and the time sequence of reference pattern feature signals in template store 140 in conjunction with the distance signal read only memory 145 to select the best candidate pattern. ROM 145 stores all the distance signals as addressed by the reference pattern indices in template store 140 and selected reference pattern indices in recognition processing store 150.

Referring to FIG. 5, the minimum distance storage location in store 150, DISTmin is set to infinity, the best candidate identifier location j* is set to zero, and stack index m is set to one as per initialization box 501. The loop including boxes 505, 510, 515, 520, 525 and 530 is then entered to determine the candidate reference pattern having the minimum distance signal DIST. The stack of candidates is addressed and the candidate identification index j is set to IND(m) (box 505). As per box 510, the sequence of reference pattern vector indices in template store 140 for pattern j is then addressed as well as the selected candidate pattern feature signal indices for reference pattern j in store 150. The indices for the successive frames are applied to distance signal ROM 145. The frame distance signals are transferred from the distance signal ROM to speech recognition processor 120 and the signal DIST(j) is produced therein using dynamic time warping well known in the art.

The distance signal for the current candidate pattern DIST(j) is compared to signal DISTmin (box 515). If DIST(j) is smaller than the previously determined minimum, DISTmin is replaced and the best candidate index j* is set to the current value j in box 520. Stack index m is then incremented (box 525) and the dynamic time warp comparison is repeated for the next candidate in the stack via box 530. After the last candidate distance signal has been formed and compared in the loop including boxes 505 through 530, the best candidate index identification code j* is transferred to utilization device 160 in FIG. 1 as per box 535 and wait box 301 of FIG. 3 is reentered.

The arrangement described with respect to FIGS. 3, 4 and 5 is adapted to select reference pattern candidates on the basis of similarity signals for the entire speech pattern. The invention may also be utilized to choose candidates based on portions of the speech pattern. For purposes of illustration, consider a recognition arrangement for identifying a three-digit sequence speech pattern such as in a telephone number. Since neither the digits nor the digit boundaries are known, a direct comparison between the speech pattern and 1000 possible reference patterns is required. If a limited number of candidate reference patterns are preselected, the number of time consuming comparisons can be substantially reduced.

The candidate preselection may be accomplished, in accordance with the invention, by using acoustic feature code books for only the ten possible digits. The digit code books correspond to feature signals obtained from a vector quantization analysis of digit reference subpatterns. The input speech pattern is analyzed to generate a time frame sequence of acoustic feature signals representative thereof. For each successive frame, a code book feature signal is selected for each digit subpattern and a signal corresponding to the similarity between the input speech pattern feature and the selected code book feature is produced. An interval of successive frames is defined, e.g., 20, and a signal representative of the average frame similarity signal is generated for each digit subpattern. If the average frame similarity signal falls below a threshold value, a coded signal corresponding to an interval reference subpattern is stored. The intervals are preferably overlapped, e.g., by five frames, so that portions of the speech pattern corresponding to the reference subpatterns are easily detected.

After all intervals of the input speech pattern are processed, sequences of candidate digit subpatterns are formed. Candidate patterns are determined from the selected digit subpattern sequences and only the candidate digit patterns are compared to the input speech pattern for identification. Suppose a three-digit input pattern results in the digits 2 and 0 as selected subpatterns for the first digit, 7 as the selected subpattern for the second digit and 5 and 9 as the selected subpatterns for the third digit. The only candidate strings are then 275, 279, 075, and 079. Consequently the number of input patterns to reference pattern dynamic time warp type comparisons is reduced from 1000 to 4. The sequence of operations to perform the digit string recognition according to the invention are substantially similar to those illustrated in FIGS. 3-5. The templates, however, correspond to the set of digit subpatterns. As described with respect to the alphabet reference pattern each subpattern includes a first set of signals (equation 2) consisting of a code book of the distinct feature signals found in the sequence of time frame acoustic feature signals representative of the digit, each subpattern being together with a second set of index signals (equation 3) corresponding to the sequence of time frame acoustic feature signals for the digit. The speech pattern is partitioned into intervals by methods well known in the art, and sequences of identified digit codes are utilized to select the reference pattern candidates.

The invention may also be adapted to limit the number of pattern comparisons in a large vocabulary spoken word recognizer by selecting candidates on the basis of vowel sequences. In such an arrangement, the reference subpatterns are limited to the set of vowels. The input utterance is analyzed to generate a time frame sequence of acoustic feature signals. For each successive frame, a vowel code book feature signal is selected for each reference vowel subpattern and a signal representative of the similarity between the utterance frame feature and the selected vowel feature is generated. A speech frame interval is defined and an average similarity signal for the intervals is produced. An interval subpattern code is stored for a vowel if its average similarity signal, as measured by average distance, falls below a predetermined threshold. The stored subpattern codes define vowel sequences in the input utterance so that only reference words with candidate vowel sequences are compared to input utterance feature signal sequences for its identification.

Figure 6:
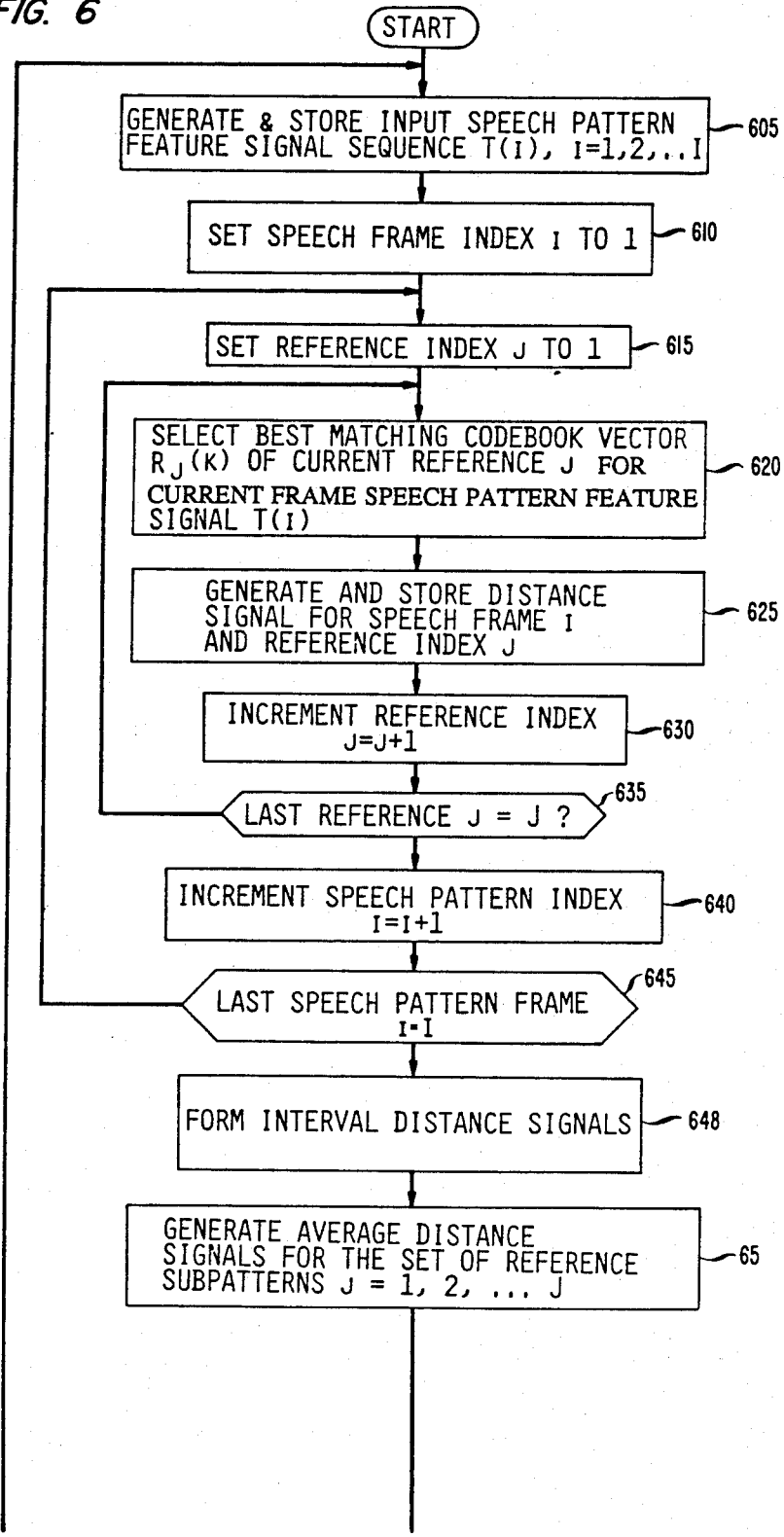
FIGS. 6 and 7 are flowcharts illustrating the operation of the circuit of FIG. 1 in selecting candidates for recognition using reference subpattern templates.
Figure 7:
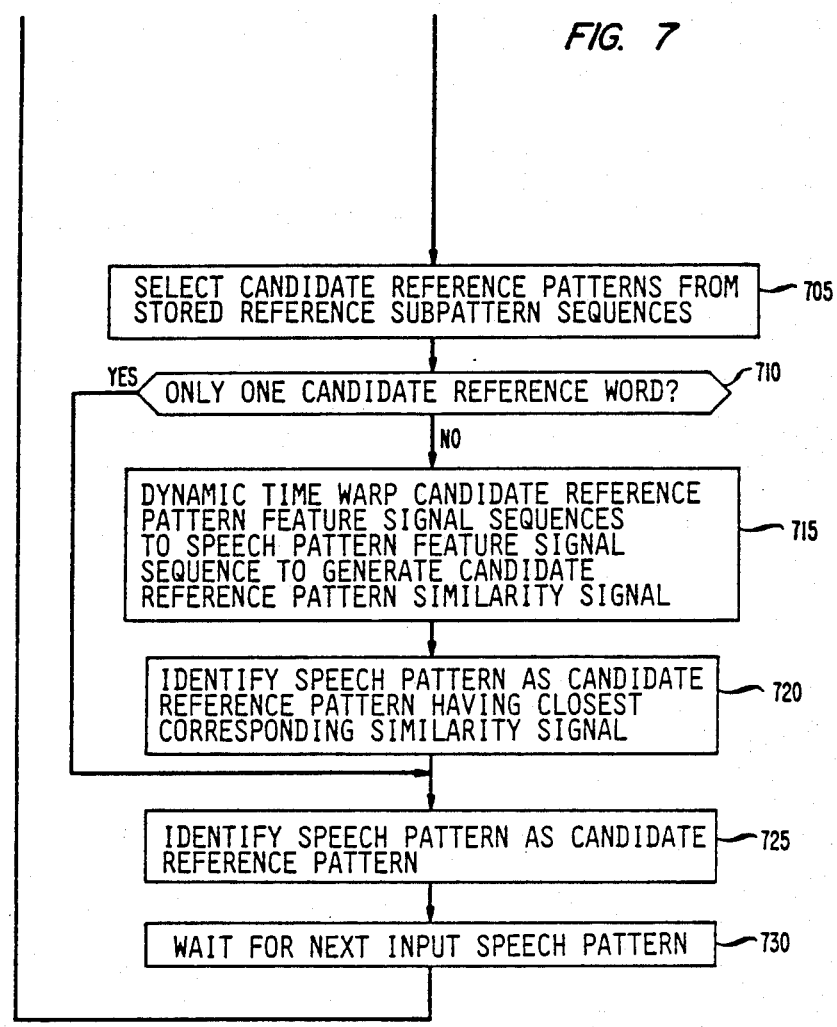
Figure 8:
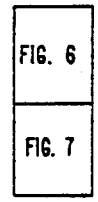
FIG. 8 shows the arrangement of FIGS. 6 and 7.

The flow charts of FIGS. 6 and 7 illustrate the arrangements of the circuit of FIG. 1 to perform vowel sequence based pattern recognition. The instructions to carry out the operations shown in FIGS. 6 and 7 are listed in FORTRAIN language form in Appendix C hereto and are permanently stored in program store 135. Reference template store 140 in FIG. 1 contains a plurality of code books, one for each vowel subpattern. Each code book comprises a group of LPC feature vector signals derived from a vector quantization analysis of utterances of the code book vowel. As described with respect to the alphabet reference pattern each vowel subpattern includes a first set of signals (equation 2) consisting of a code book of the distinct feature signals found in the sequence of time frame LPC vector signals representative of the vowel, each subpattern being together with a second set of index signals (equation 3) corresponding to the sequence of time frame acoustic feature signals for the vowel. It is to be understood, however, that other than vowel subpatterns could also be used so that the arrangement can be used to recognize other types of speech patterns.

Referring to FIG. 6, an input spoken word is transformed into a time frame sequence of speech pattern feature signals in feature signal generator 110 and stored in feature signal store 130 as per box 605. Initially, speech frame index i, and reference subpattern index j are set to 1 (boxes 610 and 615). The operations of the loop including boxes 620, 625, 630 and 635 are then performed for the current speech frame index so that the reference subpattern feature signal that best matches the current speech frame feature signal is selected from each code book and a signal representative of the similarity between the selected code book vector and the current speech frame feature signal is produced and added to the preceding frame similarity signals. After the last reference subpattern is processed, the cumulative similarity signals for all the reference subpatterns are stored in recognition processing store 150. Speech pattern frame index i is incremented (box 640) and similarity signals for the successive frames are generated and stored.

When processing for the last speech frame is completed, control is passed to boxes 648 and 650 via decision box 645. Overlapping intervals are defined and interval distance signals are formed from the stored frame distance signals in store 150. The average distance signal for every interval of each reference subpattern is then generated. These average interval distance signals are compared to a predetermined threshold signal stored in template store 140. Codes identifying the reference subpatterns having average interval distance signals falling below the threshold are determined and stored in recognition processing store 150 (box 655).

At this time, store 150 contains a set of signals identifying the reference subpatterns that have a prescribed degree of similarity with each interval portion of the input speech pattern. Box 705 of FIG. 7 is then entered and processor 120 is operative to select candidate reference patterns on the basis of the sequences of interval subpattern codes. If only one candidate is obtained, box 725 is entered via decision box 710. A code identifying the speech pattern as that candidate is then transmitted to utilization device 160. Where two or more candidates are obtained, the sequence of speech pattern feature signals are dynamically time warped to the sequence of feature signals for the selected candidate reference patterns stored in template store 140 as per box 715. The speech pattern is then identified as the closest corresponding candidate reference pattern (box 720). A code identifying the closest corresponding pattern is transmitted to utilization device 160 as per box 725 and the circuit of FIG. 1 remains quiescent until a new speech pattern is received (box 730).

Consider, for example, the recognition of a large vocabulary of words including the subset listed in the first column of table 1. Each word is coded in terms of vowel sequences that are expected in the spoken versions of the word. The vowel sequences are illustrated in the second column of table 1.

The word "AM" in the table has the vowel (diphthong), $e^I$, followed by the vowel e. The ( ) represents the initial and final portions of the word and consonants within the word. The input speech pattern is assumed to correspond to a word in the vocabulary list of Table 1. Processing in the circuit of FIG. 1, according to the flow charts of FIGS. 6 and 7, may result in the detection of the vowel sequence pattern, ( ) ɔ ( ) Λ ( ). As illustrated in Table 1, above, and as carried out according to the steps in FIGS. 6 and 7, each of the selected set of LPC feature signals with time and sequence information removed, derived from the frame sequence of LPC feature signals T(i) is compared to feature signal reference subpatterns having time and sequence information removed, for at least the vowels shown in Table 1, as this is a test which will easily eliminate the poorer candidate reference subpatterns, to generate a distance signal for each input utterance subpattern with respect to each of the reference subpatterns (box 620). Average distance signals for each predetermined interval are generated (boxes 648 and 650). The candidate reference patterns corresponding to the subpatterns which satisfied the threshold for use in subsequent testing are selected (box 750), for example, "August" and "Boston" because of their vowel sequences. Referring to Table 1, the only candidate words that are possible are "August" and "Boston". Consequently, only reference patterns for these two words need be compared to the input speech pattern for identification of the unknown pattern.

While the invention has been shown and described with reference to particular embodiments thereof, it is to be understood that various modifications may be made by those skilled in the art without departing from the spirit and scope of the invention.

TABLE 1

| | |
|---|---|
| AM | ( )$e^I$( )e( ) |
| April | ( )$e^I$( )I( ) |
| Area | ( )$e^I$( )I( ) ( ) |
| Arrive | ( )Λ( )$a^I$( ) |
| August | ( )ɔ( )Λ( ) |
| Boston | ( )ɔ( )Λ( ) |
| Chicago | ( )I( )a( )$O^v$( ) |

APPENDIX A

```
C

C    MICROPROCESSOR PROGRAM TO GET LPC AND ENERGY OF A WORD

C

5         SUBROUTINE GETLPCFEAT(T,L)

C

DIMENSION S(300),T(10,200)
          PARAMETER NI=300,NSL=40,IP=10

C

10        ISTART=0
          IEND=0
          EMAX=0.
   10     N=0
   20     N=N+1
```

```
C
C   PROCESS N-TH BUFFER OF SIGNAL
C
        CALL LPCENG(S,NL,T,IP,N)
        IF(T(IP,N).GT.EMAX) EMAX=T(IP,N)
C
C   DETERMINE IF WORD HAS STARTED
C
        CALL ENDPTS(T(1,N),ISTART,IEND)
        IF(ISTART.EQ.0) GO TO 10
C
C   WORD HAS STARTED
C
        IF(IEND.EQ.0) GO TO 20
C
C   LINEARLY WARP WORD TO NSL FRAMES
C
        CALL LWARP(T,N,NSL,EMAX)
        L=N
        RETURN
        END

C   ENDPTS--SIMPLE ENDPOINT DETECTOR BASED ON ENERGY ALONE
C
        SUBROUTINE ENDPTS(E,IS,IE)
C
C   E=ENERGY OF FRAME
C   IS=1 IF WORD HAS STARTED, 0 OTHERWISE
C   IE=1 TO INDICATE END OF WORD
C
        EMIN=1.E6
C
        IF(E.GT.EMIN.AND.IS.EQ.0) IS=1
        IF(IS.EQ.1.AND.E.LT.EMIN) IE=1
C
        RETURN
        END
```

```
C  LPCENG--CALCULATE LPC AND ENERGY FOR A GIVEN SPEECH FRAME
C
       SUBROUTINE LPCENG(S,NL,T,IP,N)
       DIMENSION S(300),T(10,200),R(10),PAR(10),APREV(10)
C
C  S=SPEECH ARRAY
C  NL=NO OF SAMPLES FOR LPC AND ENERGY ANALYSIS
C  U=MATRIX OF LPC COEFFICIENTS WITH ENERGY
C  STORED IN LAST POSITION
C  IP=NO OF COEFFICIENTS (LPC + ENERGY) PER FRAME
C  N=CURRENT FRAME NUMBER
C
C  WINDOW SPEECH SAMPLES BY HAMMING WINDOW
C
       DO 10 J=1,NL
   10  S(J)=S(J)*(0.54-0.46*COS((6.24318*(J-1)/(NL-1)))
C
C  MEASURE AUTOCORRELATION OF WINDOWED FRAME
C
       DO 20 J=1,IP-1
       R(J)=0.
       DO 15 K=1,NL-J+1
   15  R(J)=R(J)+S(K)*S(K+J-1)
   20  CONTINUE
C
C  SAVE LOG ENERGY
C
       T(IP,N)=10.*ALOG10(R(1))
C
C  CALCULATE LPC COEFFICIENTS
C
       J=1
       RES=R(J)
   30  PAR(J)=0.
       J1=J-1
       IF(J1.LT.1) GO TO 50
       DO 40 K=1,J1
       IJ=J-K+1
```

```
   40      PAR(J)=PAR(J)+APREV(K)*R(IJ)
   50      PAR(J)=(-PAR(J)-R(J+1))/RES
   55      A(J)=PAR(J)
           J1=J-1
           IF(J1.LT.1) GO TO 70
           DO 60 K=1,J1
           IJ=J-K
   60      A(K)=APREV(K)+PAR(J)*APREV(IJ)
   70      RES=(1.-PAR(J)*PAR(J))*RES
           DO 80 L=1,J
   80      APREV(L)=A(L)
           J=J+1
           IF(J.LE.IP-2) GO TO 30
C
C  CONVERT TO REFERENCE FORMAT
C
           APREV(1)=1.
           DO 90 J=1,IP-2
   90      APREV(J+1)=A(J)
           DO 100 J=1,IP-1
           I1=IP+1-J
           A(J)=APREV(J)
           DO 110 K=2,I1
           K1=K+J-1
  110      A(J)=A(J)+APREV(K)*APREV(K1)
  100      CONTINUE
           A(IP-1)=APREV(IP-1)
           DO 120 J=1,IP-1
           IF(J.EQ.1) T(J,N)=A(J)
           IF(J.NE.1) T(J,N)=2.*A(J)
  120      CONTINUE
C
           RETURN
           END
```

```
C  LWARP--LINEAR WARP LPC AND ENERGY TO FIXED LENGTH
C
       SUBROUTINE IWARP(T,N,NSL,EMAX)
C
C  U=ORIGINAL FEATURE VECTOR (LPC + ENERGY)
C  N=NO OF FRAMES IN ORIGINAL WORD
C  NSL=NORMALIZED LENGTH
C  EMAX=ENERGY PEAK FOR AMPLITUDE NORMALIZATION
C
       DIMENSION T(10,200),CRW(40,10)
C
       DO 10 I=1,N
 10    T(10,I)=T(10,I)-EMAX
C
       DO 12 I=1,10
       CRW(1,I)=CR(1,I)
 12    CRW(NSL,I)=CR(N,I)
C
C  CONSTANT RATIO (N-1)/(NSL-1) IS USED FOR WARPING
C
       XSCL=FLOAT(N-1)/FLOAT(NSL-1)
       DO 20 J=2,NSL-1
       Y=FLOAT(J-1)*XSCL+1.
       JY1=Y
       JY2=Y+1.
       A1=JY2-Y
       A2=Y-JY1
       DO 15 I=1,10
 15    CRW(J,I)=CR(JY1,I)*A1+CR(JY2,I)*A2
 20    CONTINUE
C
       DO 25 I=1,10
       DO 25 J=1,NSL
 25    T(I,J)=CRW(J,I)
       RETURN
       END
```

APPENDIX B

```
C
C  MICROPROCESSOR PROGRAM FOR ISOLATED WORD RECOGNITION
C  USING WORD BASED CODEBOOKS IN A VECTOR QUANTIZER
C  FOLLOWED BY DYNAMIC TIME WARPING FOR ANY CANDIDATES
C  NOT ELIMINATED BY THE PREPROCESSOR
C
       DIMENSION T(10,200),EPS(NVOC),P(NVOC),
       Q(10,NVECT,NVOC),IN(200,NVOC),
     1 IND(NVOC),REF(NSL,NVOC),DIST(NVOC)
       DIMENSION DVECT(NVECT,NVECT)
       COMMON/VQPROD/VQMPY(NVOC,NVECT,NVECT)
C
       PARAMETER NVOC=10, NVECT=8, NSL=40, IP=10, DTHR=0.08
       PARAMETER JDEV=02K, EO=04K
       PARAMETER DEV1=08K, DEV2=16K, DEV3=32K
C
       DATA (P(I),I=1,NVOC)/NVECT,NVECT,NVECT,NVECT,NVECT,
       NVECT,NVECT,NVECT,
     1 NVECT,NVECT/
C
C  READ IN STORED DATA
C
       CALL FGET(VQMPY,DEV1)
       CALL FGET(REF,DEV2)
       CALL FGET(Q,DEV3)
C
C  WAIT FOR PULSE RESET TO INDICATE NEW INPUT SPEECH PATTERN
C
     1 CALL WAIT(EO)                           ;BLOCK 301
       CALL GETLPCFEAT(T,L)                    ;BLOCK 302
       J=1                                     ;BLOCK 304
     5 EPS(J)=0.                               ;BLOCK 305
       J=J+1                                   ;BLOCK 310
       IF(J.LE.NVOC) GO TO 5                   ;BLOCK 312
```

```
             I=1                                    ;BLOCK 315
        6    J=1                                    ;BLOCK 320
        7    DMIN=1.E75                             ;BLOCK 322
             KSTAR=0
   5         K=1                                    ;BLOCK 325
        10   CALL FDIST(T(1,I),Q(1,K,I),D)          ;BLOCK 327
             IF(D.GT.DMIN) GO TO 15                 ;BLOCK 330
             DMIN=D                                 ;BLOCK 332
             KSTAR=K
  10    15   K=K+1                                  ;BLOCK 335
             IF(K.LE.P(J)) GO TO 10                 ;BLOCK 338
             EPS(J)=EPS(J)+DMIN                     ;BLOCK 340
             IN(I,J)=KSTAR                          ;BLOCK 342
             J=J+1                                  ;BLOCK 345
  15         IF(J.LE.NVOC) GO TO 7                  ;BLOCK 350
             I=I+1                                  ;BLOCK 355
             IF(I.LE.L) GO TO 6                     ;BLOCK 360
        C

DMIN=1.E75                             ;BLOCK 402
  20         J=1
        20   IF(EPS(J)/L.GT.DMIN) GO TO 25          ;BLOCK 405
             DMIN=EPS(J)/L                          ;BLOCK 410
        25   J=J+1                                  ;BLOCK 415
             IF(J.LE.NVOC) GO TO 20                 ;BLOCK 420
  25         J=1                                    ;BLOCK 425
             ISTK=1
        30   IF(EPS(J)/L.GT.DMIN+DTHR) GO TO 40     ;BLOCK 430
             IND(ISTK)=J                            ;BLOCK 435
             ISTK=ISTK+1                            ;BLOCK 440
  30    40   J=J+1                                  ;BLOCK 445
             IF(J.LE.NVOC) GO TO 30                 ;BLOCK 450
             IF(ISTK.GT.2) GO TO 100                ;BLOCK 455
             RPAT=IND(1)                            ;BLOCK 460
             CALL FSEND(RPAT,JDEV)                  ;BLOCK 465
  35         GO TO 1
```

```
      100     DISTMIN=1.E75                                ;BLOCK 501
              JSTAR=0
              M=1
      110     J=IND(M)                                     ;BLOCK 505
              DO 115 I=1,NVECT
              DO 115 II=1,NVECT
      115     DVECT(I,II)=VQMPY(J,I,II)
              CALL DPWARP(IN(1,J),REF(1,J),DIST(J))        ;BLOCK 510
              IF(DIST(J).GT.DISTMIN) GO TO 120             ;BLOCK 515
              DISTMIN=DIST(J)                              ;BLOCK 520
              JSTAR=J
      120     M=M+1                                        ;BLOCK 525
              IF(M.LT.ISTK) GO TO 110                      ;BLOCK 530
              RPAT=JSTAR
              CALL FSEND(RPAT,JDEV)                        ;BLOCK 535
              GO TO 1
C
              END
C
C     SUBROUTINES USED IN APPENDICES A AND B
C
              SUBROUTINE FDIST(T,R,D)
              PARAMETER IPP=9
C
              D=0.
              DO 10 I=1,IPP
              D=D+T(I)*R(I)
      10      CONTINUE
              D=D-1.
              RETURN
              END
C     DYNAMIC PROGRAMMING WARP USING VQ INDICES
C
              SUBROUTINE DPWARP(INDT,INDR,DR,L,DVECT)
```

```
      DIMENSION INDT(L),INDR(L),DVECT(8,8)
      DIMENSION D(100),DCU(100)
      INTEGER DL/0/
      DATA XLRG/1000./
5     DATA K/2/
      IMAX(I)=MINO(K*(I-1)+1+DL,(I-NN)/K+MM+DL,MM)
      IMIN(I)=MAXO((I-1)/K+1-DL,K*(I-NN)+MM-DL,1)
      IF(MM.GE.K*NN.OR.NN.GE.K*MM) DR=XLRG
      IF(MM.GE.K*NN.OR.NN.GE.K*MM)RETURN
10  C IT=1
      IR1=IMIN(1)
      IR2=IMAX(1)
      IT=1
      DO 60 IR=IR1,IR2
15    DCU(IR)=DVECT(INDR(IR),INDT(1))
60    CONTINUE
      DO 65 IR=IR2+1,MM
      DCU(IR)=XLRG
65    CONTINUE
20    DO=DCU(1)
      DO 200 IT=2,NN
      XMND=XLRG
      IR1P=IR1
      IR2P=IR2
25    IR1=IMIN(IT)
      IR2=IMAX(IT)
      D1=XLRG
      D2=XLRG
      IF(IR1-1.GE.IR1P)D1=ABS(DCU(IR1-1))
30    IF(IR1-2.GE.IR1P)D2=ABS(DCU(IR1-2))
      DO 30 IR=IR1,IR2
      D(IR)=DVECT(INDR(IR),INDT(IT))
30    CONTINUE
      DO 100 IR=IR1,IR2
35    DO=ABS(DCU(IR))
      DI=D2
      LPTH=2
```

```
            IF(D1-D2)10,11,11
     10     LPTH=1
            DI=D1
     11     IF(D0-DI)12,12,20
     12     CONTINUE
            IF(IR.GT.IR2P)GO TO 20
            IF(DCU(IR).LT.0) GO TO 20
            LPTH=0
            DI=D0
     20     CONTINUE
            DI=DI+D(IR)
            IF(XMND-DI)50,50,51
     51     XMND=DI
            IRMN=IR
     50     CONTINUE
            IF(LPTH.EQ.0) DI=-DI
            D2=D1
            D1=D0
            DCU(IR)=DI
    100     CONTINUE
            IF(IR1.LE.IR1P)GO TO 92
            DO 91 IR=IR1P,IR1-1
            DCU(IR)=XLRG
     91     CONTINUE
            IF(IR2.GE.IR2P)GO TO 93
            DO 92    IR=IR2+1,IR2P
            DCU(IR)=XLRG
     92     CONTINUE
     93     CONTINUE
            DD=XMND-D0
            D0=XMND
    200     CONTINUE
            DR=XMND
            RETURN
            END
```

APPENDIX C

```
C  MICROPROCESSOR PROGRAM FOR ISOLATED WORD RECOGNITION USING
C  VOWEL BASED VECTOR QUANTIZER ON A WORD VOCABULARY
C
       DIMENSION T(10,200),D(200,NQNT),Q(10,NVECT,NQNT),
       DW(40,NQNT),
     1 NVOW(NVOC),VOW(NVOC,10),ICAND(NVOC)
       COMMON/PATTERNS/REF(10,NSL,NVOC)
C
       PARAMETER NVOC=10, NQNT=5, NSL=40, MW=20, MSHF=5,
                 IP=10, DTH=0.4
       PARAMETER JDEV=02K, EO=04K
       PARAMETER DEV1=08K, DEV2=16K, DEV3=32K, DEV4=64K
C
C  READ IN STORED DATA
C
       CALL FGET(NVOW,DEV1)
       CALL FGET(VOW,DEV2)
       CALL FGET(REF,DEV3)
       CALL FGET(Q,DEV4)
C
     1 CALL WAIT(EC)
       CALL GETLPCFEAT(T,L)
       DO 5 J=1,NQNT
       DO 5 I=1,L
     5 D(I,J)=0.
C
       I=1
    10 J=1
    15 DMIN=1.E75
       DO 20 K=1,NVECT
       CALL FDIST(T(1,I),Q(1,K,J),DT)
       IF(DT.GT.DMIN) GO TO 20
       DMIN=DT
    20 CONTINUE
```

```
            D(I,J)=DMIN
            J=J+1
            IF(J.LE.NQNT) GO TO 15
            I=I+1
            IF(I.LE.L) GO TO 10
      C
      C  FORM INTERVAL PATTERNS
      C
            MINT=(L-MW+MSHF)/MSHF
            DO 35 J=1,NQNT
            DO 30 M=1,MINT
            DW(M,J)=0.
            DO 25 I=(M-1)*MSHF+1,(M-1)*MSHF+MW
       25   DW(M,J)=DW(M,J)+D(I,J)
       30   DW(M,J)=DW(M,J)/MW
       35   CONTINUE
      C
      C  MATCH AGAINST STORED VOCABULARY PATTERNS
      C
            ISTK=1
            DO 50 I=1,NVOC
            M1=1
            DO 45 N=1,NVOW(I)
            J1=VOW(I,N)
            DO 40 M=M1,MINT
            IF(DW(M,J1).GT.DTH) GO TO 40
            M1=M
            GO TO 45
       40   CONTINUE
            GO TO 50
       45   CONTINUE
            ICAND(ISTK)=I
            ISTK=ISTK+1
       50   CONTINUE
      C
      C  CHECK NUMBER OF CANDIDATES--IF 1 THEN DONE, OTHERWISE DO DTW
      C
```

```
        IF(ISTK.GT.2) GO TO 60
        RPAT=ICAND(1)
        CALL FSEND(RPAT,JDEV)
        GO TO 1
C
60      DISTMIN=1.E75
        JSTAR=0
        M=1
65      J=ISTK(M)
        CALL DPWARPT(T,REF,DIST(J),L)
        IF(DIST(J).GT.DISTMIN) GO TO 70
        DISTMIN=DIST(J)
        JSTAR=J
70      M=M+1
        IF(M.LT.ISTK) GO TO 65
        RPAT=JSTAR
        CALL FSEND(RPAT,JDEV)
        GO TO 1
        END
C
        SUBROUTINE DPWARPT(T,R,DR,L)
        DIMENSION T(10,L),R(10,L)
        DIMENSION D(100),DCU(100)
        INTEGER DL/0/
        DATA XLRG/1000./
        DATA K/2/
        IMAX(I)=MINO(K*(I-1)+1+DL,(I-NN)/K+MM+DL,MM)
        IMIN(I)=MAXO((I-1)/K+1-DL,K*(I-NN)+MM-DL,1)
        IF(MM.GE.K*NN.OR.NN.GE.K*MM) DR=XLRG
        IF(MM.GE.K*NN.OR.NN.GE.K*MM)RETURN
C   IT=1
        IR1=IMIN(1)
        IR2=IMAX(1)
        IT=1
        DO 60 IR=IR1,IR2
        CALL FDIST(R(1,IR),T(1,1),DCU(IR))
60      CONTINUE
```

```
        DO 65 IR=IR2+1,MM
        DCU(IR)=XLRG
65      CONTINUE
        DO=DCU(1)
        DO 200 IT=2,NN
        XMND=XLRG
        IR1P=IR1
        IR2P=IR2
        IR1=IMIN(IT)
        IR2=IMAX(IT)
        D1=XLRG
        D2=XLRG
        IF(IR1-1.GE.IR1P)D1=ABS(DCU(IR1-1))
        IF(IR1-2.GE.IR1P)D2=ABS(DCU(IR1-2))
        DO 30 IR=IR1,IR2
        CALL FDIST(R(1,IR),T(1,IT),D(IR))
30      CONTINUE
        DO 100 IR=IR1,IR2
        DO=ABS(DCU(IR))
        DI=D2
        LPTH=2
        IF(D1-D2)10,11,11
10      LPTH=1
        DI=D1
11      IF(DO-DI)12,12,20
12      CONTINUE
        IF(IR.GT.IR2P)GO TO 20
        IF(DCU(IR).LT.0) GO TO 20
        LPTH=0
        DI=DO
20      CONTINUE
        DI=DI+D(IR)
        IF(XMND-DI)50,50,51
51      XMND=DI
        IRMN=IR
50      CONTINUE
        IF(LPTH.EQ.0) DI=-DI
```

```
              D2=D1
              D1=D0
              DCU(IR)=DI    .    .
                                 .
     100      CONTINUE      .
 5            IF(IR1.LE.IR1P)GO TO 92
              DO 91 IR=IR1P,IR1-1
              DCU(IR)=XLRG
     91       CONTINUE
              IF(IR2.GE.IR2P)GO TO 93
10            DO 92   IR=IR2+1,IR2P
              DCU(IR)=XLRG
     92       CONTINUE
     93       CONTINUE
              DD=XMND-DO
15            DO=XMND
     200      CONTINUE
              DR=XMND
              RETURN
              END
```

What is claimed is:

1. A method for recognizing a speech pattern, of the type comprising the steps of storing for each reference utterance, for each of a plurality of training trials of such utterance, a reference subpattern set of acoustic feature signals without time-sequence information, deriving from an input utterance containing the speech pattern to be recognized an input subpattern set of acoustic feature signals without time-sequence information during each time frame into which said utterance is divided to yield sets suitable for comparison with the reference sets, comparing said input subpattern set of acoustic feature signals with each reference subpattern set of acoustic feature signals to yield a plurality of similarity signals, and making a recognition decision regarding said similarity signals, said method being characterized in that the storing step includes storing for each reference utterance, for each of a plurality of training trials of such utterance, a reference pattern set of acoustic feature signals including time-sequence information, each said reference pattern set being associated with the corresponding said reference subpattern set, deriving for the said input utterance an input pattern set of acoustic feature signals including time-sequence information, said input pattern set being associated with the corresponding said input subpattern set, and the step of making a recognition decision includes the steps of setting a similarity signal threshold which will be satisfied or exceeded for a plurality of the reference subpattern sets (hereinafter the candidate reference subpattern sets) during the comparing step, and comparing by dynamic programming each of the reference pattern sets corresponding to the candidate reference subpattern sets with the said input pattern set to determine which is most similar thereto.

2. A method for recognizing a speech pattern, of the type claimed in claim 1, said method being further characterized in that the step of comparing by dynamic programming comprises comparing dynamic time-warping, with a corresponding form of the input pattern set.

3. A method for recognizing a speech pattern, of the type claimed in claim 1, said method being characterized in that the storing and deriving steps include employing respective series of indices to associate pattern sets including time-sequence information with the subpattern sets, said indices being stored with the respective sets to be associated.

* * * * *

UNITED STATES PATENT AND TRADEMARK OFFICE
CERTIFICATE OF CORRECTION

PATENT NO.   :   4,860,358
DATED        :   August 22, 1989
INVENTOR(S)  :   Lawrence R. Rabiner It is certified that error appears in the above-identified patent and that said Letters Patent is hereby corrected as shown below:

Column 3, line 10, change "diagramm" to --diagram--.

Column 4, line 46, change "of signal set of signals" to --of signals--.

Column 5, line 20, change "243" to --232--.

Column 40, line 55, after "comparing" add --by dynamic time-warping each of the reference pattern sets, in a form suitable for--.

Signed and Sealed this

Sixth Day of August, 1991

*Attest:*

HARRY F. MANBECK, JR.

*Attesting Officer*     *Commissioner of Patents and Trademarks*